Figure 1:
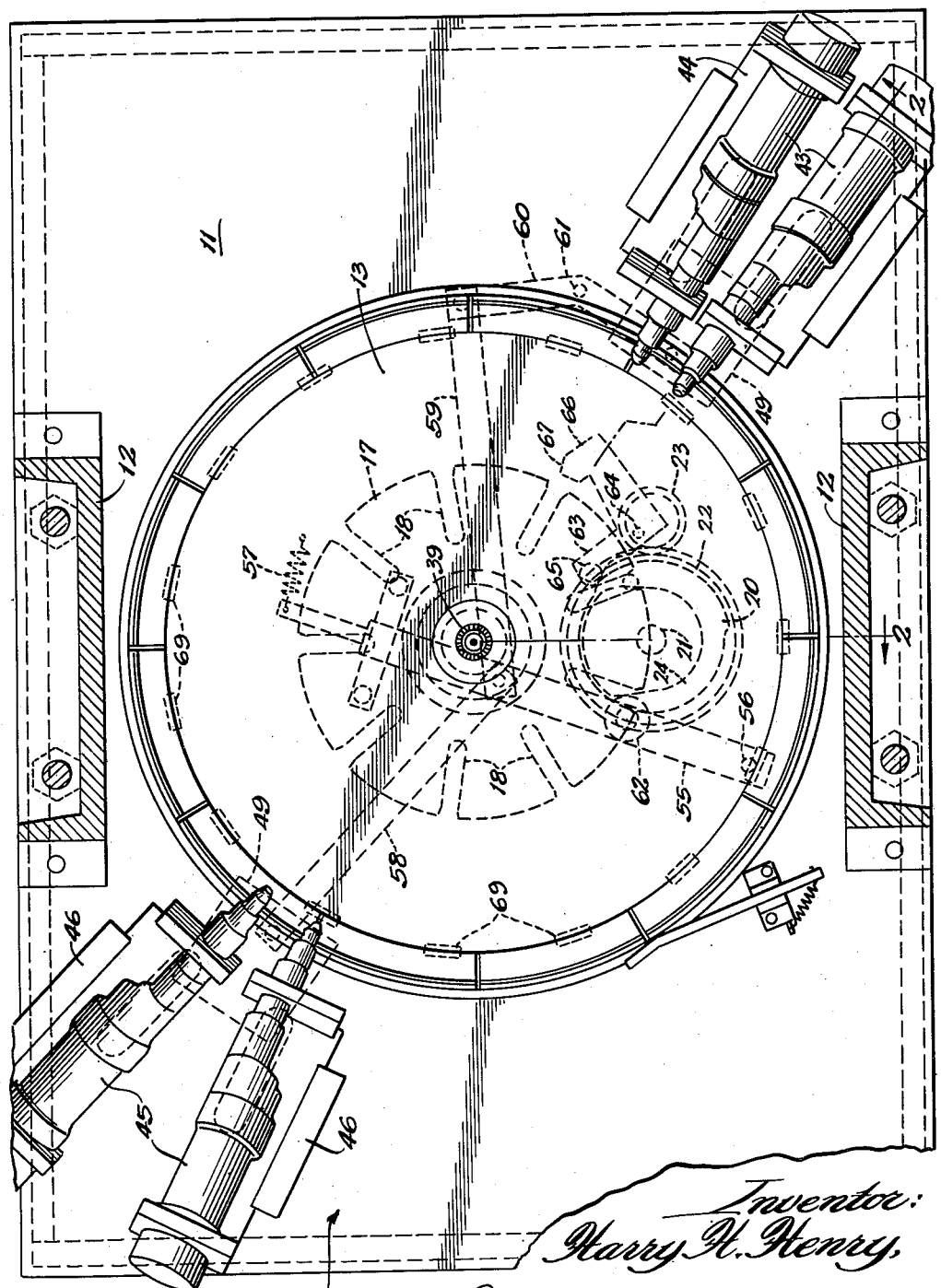

Dec. 5, 1950   H. H. HENRY   2,533,113
WIRE WHEEL SPOKE TIGHTENING MACHINE
Filed Dec. 21, 1946   2 Sheets-Sheet 1

Inventor:
Harry H. Henry,
By Dawson, Booth and Spangenberg,
Attorneys.

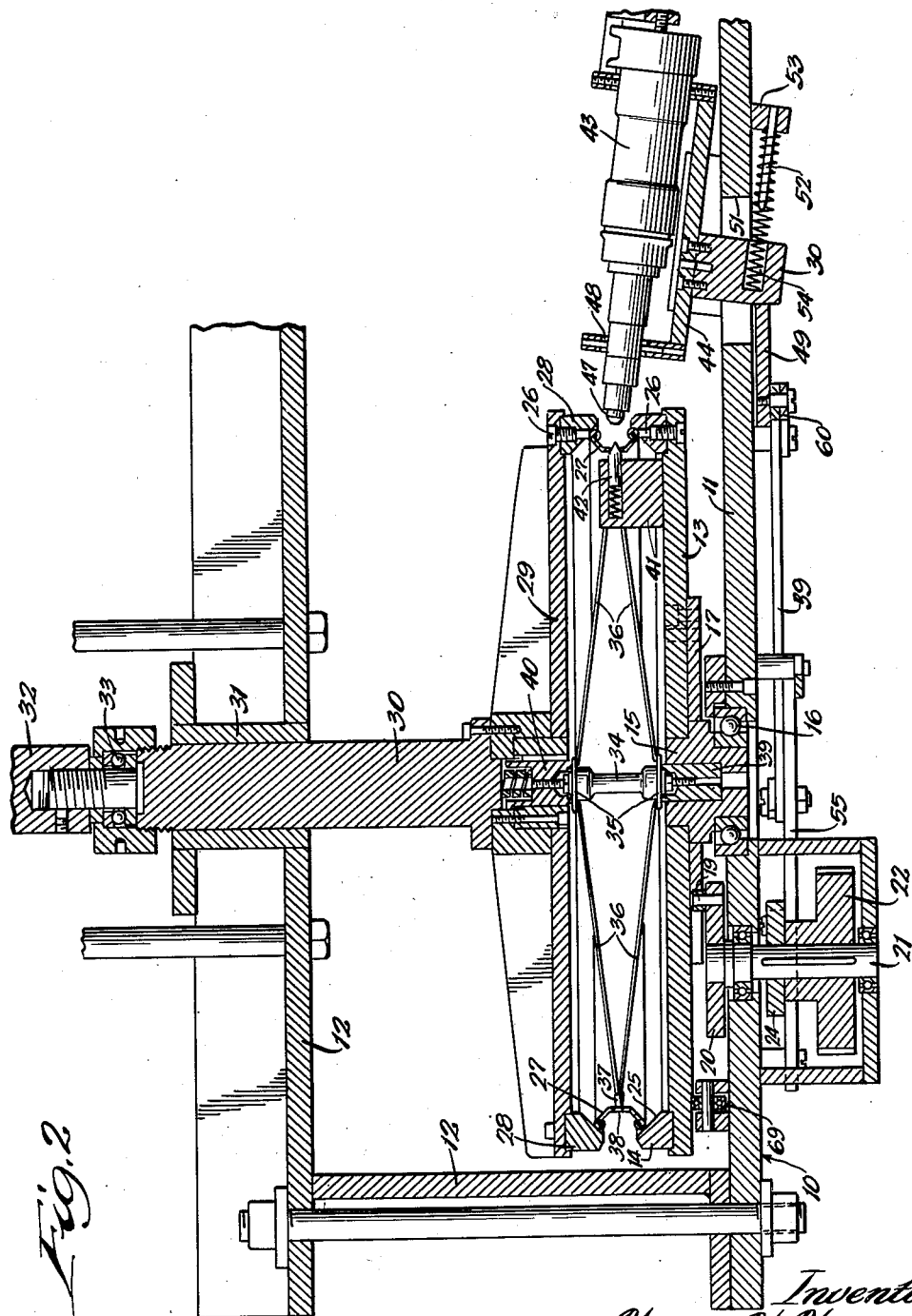

Patented Dec. 5, 1950

2,533,113

UNITED STATES PATENT OFFICE 2,533,113

WIRE WHEEL SPOKE TIGHTENING MACHINE

Harry H. Henry, Chicago, Ill., assignor to Monark Silver King, Inc., Chicago, Ill., a corporation of Delaware Application December 21, 1946, Serial No. 717,780

4 Claims. (Cl. 157—1.5)

This invention relates to wheel assembling mechanism, and more particularly to the assembly of hub spokes in a bicycle wheel and the tightening of the spokes upon the rim of the wheel. The invention is applicable to other uses.

An object of the present invention is to provide mechanism for accurately carrying through the final assembly of hub spokes upon the rims of bicycle wheels whereby a true assembly is obtained with the rim, hub, and the spokes in the desired alignment. Yet another object is to provide means whereby the tightening of spokes upon the rims of bicycle wheels can be effected while producing a true alignment of the parts, the assembly operation being speedy and accurate and requiring a minimum of manual control. Yet another object is to provide means for producing a rapid tightening of spokes upon the rim of a bicycle wheel and the like while controlling the degree of tautness thereof so as to maintain the wheel parts in true alignment. Other specific objects and advantages will appear as the specification proceeds.

The invention is illustrated, in a preferred embodiment, by the accompanying drawings, in which—

Figure 1 is a top plan view of apparatus embodying my invention; and Fig. 2, a broken sectional view, the section being taken as indicated at line 2—2 of Fig. 1.

In the illustration given, 10 designates a frame providing suitable supports for a platform 11 and for a guide structure 12 above the platform 11.

Rotatably mounted upon the plate or platform 11 is a clamping plate 13 carrying along its periphery an annular clamping member 14. The plate 13 is mounted upon a collar 15 mounted upon ball bearings 16. Fixed to the underside of the plate 13 is a drive plate 17 provided at spaced points with drive slots 18. The drive slots 18 are arranged for driving engagement intermittently by a roller-equipped pin 19 carried by the cam plate 20. The cam plate 20 is fixed upon shaft 21 and driven by the gear 22. Gear 22 is in turn driven by pinion 23 leading from any suitable power source (not shown). Also fixed to shaft 21 is a smaller cam disk 24. The roller-equipped pin 19 by periodic engagement with the slots 18 produces an intermittent movement of the drive disk 17 and clamping plate 13.

The clamping ring 14 is provided with a downwardly and inwardly-inclined wall 25, and at closely-spaced intervals about the ring 14 are stop members 26. The stop member 26 may be of any suitable structure or shape designed to accurately support the lower end of the bicycle rim 27. The member 26 may be in the form of a spring-pressed plunger or, as shown in Fig. 1, a screw member providing a flat top surface receiving the lower edge of rim 27.

Above the clamping member 14 I provide an upper clamping member 28 of substantially the same structure as member 14 but inverted in position. The member 28 is also provided with closely-spaced stop members 26 and is carried by a vertically-movable clamping plate 29. The plate 29 is carried by a ram 30 extending upwardly through a guide member 31 provided by the frame 12. The member 31 is rotatably secured to a piston shaft 32 by means of the ball bearing connection 33. Piston shaft 32 leads to a piston in a compressed air cylinder (not shown) or to any other suitable power or manually-operable device. Since such structures are well known, it is believed unnecessary to describe them in detail herein.

Between the clamping plates 13 and 29 extends the hub 34 of a bicycle wheel, the hub being provided with the usual flanges 35 perforated to receive the spokes 36 of the wheel. The spokes 36 extend outwardly and their threaded outer ends are engaged by the threaded sleeves 37 of the screw caps 38. Such structure is the usual and well-known structure of a bicycle wheel. The screw caps 38 are provided with the usual transverse slots adapted to be engaged by the edge of a screw driver for rotating the same to tighten the spokes upon the rim.

In order to center the hub 34 with respect to the rim 27, I provide each of the plates 13 and 29 with hub-engaging members. The plate 13 is provided with an insert 39 having an upwardly-extending annular face bearing against the lower disk 35 of the hub. Similarly, a recessed insert 40 is carried by the plate member 29 and has an annular face extending downwardly and engaging the upper flange 35 of the hub 34. Preferably, the faces of the members 39 and 40 are knurled so as to tightly grip the flanges 35 of the hub 34.

In order to lock the rim 27 against rotational movement relative to the clamping members 14 and 28, I provide a plate 41 which is fixed to the clamping plate 13 and which carries a spring-pressed plunger 42. The plunger 42 is adapted to extend through the usual air-tube opening of the rim and thus to lock the rim in position.

Any suitable means for rotating the screw caps 38 to draw the threaded sleeves thereof upon the spokes 36 may be employed. If desired, power screw drivers or other rotating means may be employed about the entire circumference of the clamping plates so as to engage all or part of the screw caps 38 thereof to rotate them for bringing about the desired spoke tautness. In the specific illustration given, I provide a pair of power-drive srew drivers 43 mounted on a bracket 44 on one side of the wheel and, diametrically opposite thereto, another pair of power-drive screw drivers 45 mounted on a supporting bracket 46. In the specific illustration given, the screw drivers are driven by electric power and are provided at their forward ends with tubular members 47 adapted to engage the heads of the screw caps 38 and to guide the tool about the head. The screw driver within the tubular member 47 engages the slot in the head and rotates the same to a desired tautness. Such screw drivers are well known and need not be described in detail. They are equipped with declutching mechanism for automatically rendering the screw driver inoperative after a predetermined pressure is encountered. I prefer to have the forward end of the screw driver flexibly supported by springs within an enlarged opening 48 of the supporting bracket so that the tubular member 47 is given a little play in the guiding of the tool upon the head 38.

Instead of employing electrically-operated screw drivers of the type referred to, it will be understood that air-driven screw drivers or head-tightening mechanism may be employed, such mechanism being set for operation up to a given resistance so that the tightening of the spokes will not exceed a predetermined tautness.

Each of the brackets 44 and 46 is mounted upon a plate 49 and the plate 49 is provided with a depending member 50 extending through a slot 51 in the plate 11. Thus the member 50 is free to move within the slot 51 of plate 11 and in such movement it is preferably guided by a pin 52 carried by a lug 53 and entering a recess 54 of the depending member 50.

Any suitable means for moving the member 50 forwardly and backwardly so as to bring the screw drivers 43 into and out of operative positions may be employed. In the illustration given, I provide a bar 55 pivotally mounted at one end upon pin 56 and having its forward free end secured by a spring 57. A link 58 extends between the member 55 and the plate 49 carrying the screw drivers 43. Similarly, another link 59 connects the lever 55 and the bell crank lever 60. The lever 60 is pivoted at 61 and at its inner free end to the palte 49.

The lever 55 is provided with a roller-equipped pin 62 adapted to be engaged by the cam 24 carried on shaft 21, as shown more clearly in Fig. 1.

If desired, locking means may be provided for stabilizing the movement of the drive plate 17 during its intermittent operation. As shown more clearly in Fig. 1, a bell crank 63 is pivoted at 64 and is provided with a roller 65 engageable with the cam of the cam disk 20. The bell crank is provided with the arm 66 having an inwardly-extending pointed portion 67 engageable in the slots 18 of the disk 17.

*Operation*

In the operation of the structure, the upper clamping plate 29 is raised and a wheel assembly, as shown more clearly in Fig. 2, placed in position upon the lower clamping member 14. The upper clamping plate is then lowered to bring the clamping member 28 thereof into engagement with the rim, as shown in Fig. 2. This movement also brings the members 39 and 40 into engagement with the disks 35 of the wheel hub. The clamping members force the rim, if it is slightly out of its desired alignment, into a true alignment and so that the ends of the rim rest throughout upon the stop members 26. Thus the hub and rim of the wheel are brought into the desired final and true alignment.

The drive mechanism is now set into operation and the gear 22 is rotated so as to drive shaft 21. The cam disk 20 brings the roller-equipped pin 19 into engagement with one of the slots 18 of the drive disk 17 and rotates the disk 17 and thereby the clamping plates 13 and 29 to the next operating position. As the drive pin leaves the slot 18, the cam of cam plate 20 releases the roller 65 and the spring-urged finger 67 engages the outer portion of slot 18 to lock the plate 17 against movement. During the operation described, the cam disk 24 releases the roller-equipped pin 62 and the spring 57 draws the plates 49 forwardly and with them the power-driven screw drivers 43 and 45 into engagement with the screw caps 38. The tubular members 47 center each screw driver about the screw cap and bring the screw driver into engagement with the slot of the cap. The cap is then rotated until a prdetermined resistance is encountered, whereupon the screw driver declutches. During this operation, it will be noted that the screw drivers 43 and 45 are operating on spokes which extend in diametrically-opposite directions so that the tightening operation on one side of the wheel is counter-balanced by the tightening operation on the other side.

After the above tightening operation, the cam of plate 24 engages the roller pin 62 and swings it laterally. This movement is transmitted through lever 58 to the plate 49 supporting screw drivers 45 to move them away from the rim and, simultaneously therewith, the lever 59 operates bell crank 60 to move the plate 49 supporting screw drivers 43 rearwardly. The indexing drive operation continues, as before described, to move the disk 17 and the clamping plates 13 and 29 thereabove another spaced distance to bring the screw drivers on the opposite side of the wheel into alignment with a second pair of spokes. The tightening operation is then repeated.

After the tightening operation, the cam of cam plate 20 engages the roller 65 and tilts the bell crank 63 to the position shown in Fig. 1, thus freeing the disk 17 for rotation.

If desired, an anti-friction support 69 may be carried by plate 11 so as to engage an outer peripheral portion of the lower plate 13, as shown best in Fig. 2.

After the spokes have been tightened all around the wheel, the upper plate 29 is then raised by admitting air pressure to the cylinder above and the assembled wheel may be lifted out of the apparatus.

The resulting assembled wheel is found to be accurately aligned throughout, the tightened spokes serving to maintain the rim and the hub 34 in the desired aligned position. The operation gives far greater accuracy than can be obtained by manual assembly while at the same time the time of assembly is sharply reduced.

While in the foregoing specification, I have set forth an embodiment of the invention in considerable detail for the purpose of illustrating one mode of employing the invention, it will be understood that such details may be varied widely by those skilled in the art without departing from the spirit of my invention.

I claim:

1. In apparatus for tightening hub spokes upon the rim of a bicycle wheel, the spokes having outer threaded ends engaged by caps having threaded sleeves extending through said rim, rotatable clamping means for maintaining said rim and head in true alignment, a drive member mounted for coaxial rotation with said clamping means and having equally-spaced radial slots, cam means carrying a roller engageable with said slots operative upon rotation of the cam means to rotate intermittently the said clamping means, means for rotating said cam means, and power-operated means engaging said screw caps to rotate the same while said wheel is at rest between said intermittent movements.

2. In apparatus for tightening hub spokes upon the rim of a bicycle wheel, the spokes having outer threaded ends engaged by caps having threaded sleeves extending through said rim, rotatable clamping means for maintaining said rim and head in true alignment, a drive member mounted for coaxial rotation with said clamping means and having equally-spaced radial slots, cam means carrying a roller engageable with said slots operative upon rotation of the cam means to rotate intermittently the said clamping means, means for rotating said cam means, indexing means comprising a pivoted arm carrying a finger adapted to engage one of said slots during the intervals when said wheel is stationary and to disengage therefrom responsively to said cam means during intervals when said wheel is rotating, and power-operated means engaging said screw caps to rotate the same while said wheel is at rest between said intermittent movements.

3. In apparatus for tightening hub spokes upon the rim of a bicycle wheel, the spokes having outer threaded ends engaged by caps having threaded sleeves extending through said rim, rotatable clamping means for maintaining said rim and hub in true alignment, a drive member mounted for coaxial rotation with said clamping means and having equally-spaced radial slots, cam means carrying a roller engageable with said slots operative upon rotation of the cam means to rotate intermittently the said clamping means, means for rotating said cam means, power-operated means on opposite sides of said wheel adapted to engage and rotate said caps, and means for advancing said power-operated means to engage said caps while said wheel is at rest and for retracting said means when said wheel is being rotated.

4. In apparatus for tightening hub spokes upon the rim of a bicycle wheel, the spokes having outer threaded ends engaged by caps having threaded sleeves extending through said rim, rotatable clamping means for maintaining said rim and hub in true alignment, a drive member mounted for coaxial rotation with said clamping means and having equally-spaced radial slots, cam means carrying a roller engageable with said slots operative upon rotation of the cam means to rotate intermittently the said clamping means, means for rotating said cam means, indexing means comprising a pivoted arm carrying a finger adapted to engage one of said slots during the intervals when said wheel is stationary and to disengage therefrom responsively to said cam means during intervals when said wheel is rotating, power-operated means on opposite sides of said wheel adapted to engage and rotate said caps, and means for advancing said power-operated means to engage said caps while said wheel is at rest and for retracting said means when said wheel is being rotated.

HARRY H. HENRY.

REFERENCES CITED

The following references are of record in the file of this patent:

UNITED STATES PATENTS

| Number | Name | Date |
|---|---|---|
| 610,652 | Hurst et al. | Sept. 13, 1898 |
| 1,864,335 | Booth | June 21, 1932 |
| 1,876,356 | Sneed | Sept. 6, 1932 |
| 1,979,966 | Farr et al. | Nov. 6, 1934 |
| 1,980,129 | Eksergian | Nov. 6, 1934 |
| 2,422,593 | Smith | June 17, 1947 |

FOREIGN PATENTS

| Number | Country | Date |
|---|---|---|
| 101,558 | Germany | Feb. 22, 1899 |